United States Patent [19]

Shimano et al.

[11] 3,967,991

[45] July 6, 1976

[54] METHOD FOR PRODUCING RECEPTACLES FROM THERMOPLASTIC RESIN FOAM SHEET

[75] Inventors: Ikuya Shimano, Osaka; Takashi Matsui, Nara, both of Japan

[73] Assignee: Sekisui Kaseihin Kogyo Kabushiki Kaisha, Nara, Japan

[22] Filed: Dec. 7, 1973

[21] Appl. No.: 422,958

[30] Foreign Application Priority Data

Dec. 8, 1972   Japan............................. 47-123595
Oct. 5, 1973   Japan............................. 48-112665

[52] U.S. Cl. ............................. 156/85; 93/93 HT; 156/189; 156/198; 156/202; 156/203; 156/218; 156/293; 156/303.1; 156/306; 264/230; 264/321; 264/342 R; 264/DIG. 71
[51] Int. Cl.² .................. B29C 27/14; B29C 27/20
[58] Field of Search ............................. 156/84–86, 156/69, 198, 218, 497, 306, 184, 189, 202, 203, 303.1, 293, 294; 264/321, 230, 263, 268, 342 R, 296, 248, 88, DIG. 71; 229/1.5 B, 4.5, DIG. 12; 206/497; 93/93 HT

[56] References Cited

UNITED STATES PATENTS

| | | | |
|---|---|---|---|
| 2,942,301 | 6/1960 | Price et al............................. | 264/230 |
| 3,040,385 | 6/1962 | Folta................................... | 156/224 |
| 3,344,222 | 9/1967 | Shapiro et al......................... | 264/321 |
| 3,438,824 | 4/1969 | Balamuth............................. | 156/69 |
| 3,439,590 | 4/1969 | Rosenberg et al................... | 156/307 |
| 3,468,226 | 9/1969 | England et al....................... | 93/93 HT |
| 3,509,252 | 4/1970 | Baehr................................... | 264/296 |
| 3,547,012 | 2/1969 | Amberg et al........................ | 156/69 |
| 3,658,615 | 4/1972 | Amberg................................ | 156/218 |
| 3,666,162 | 5/1972 | Tiffin et al........................... | 229/1.5 B |
| 3,767,496 | 10/1973 | Amberg et al....................... | 156/84 |
| 3,820,684 | 6/1974 | Harrison.............................. | 206/520 |

FOREIGN PATENTS OR APPLICATIONS 1,479,805   5/1969   Germany........................... 264/230

*Primary Examiner*—Edward G. Whitby
*Attorney, Agent, or Firm*—Sughrue, Rothwell, Mion, Zinn & Macpeak

[57] ABSTRACT

A method for producing receptacles of a thermoplastic resin foam sheet, which comprises forming a cylinder of a rectangular-shaped uni-directionally shrinkable thermoplastic resin foam sheet which, when heated, shrinks in a first direction to a greater extent than other directions perpendicular to said first direction, so that when heated, the thermoplastic resin foam sheet will shrink toward the central axis of the cylinder; bonding the side edges of the sheet forming the cylinder; heating the foam sheet on a molding form to a temperature above the softening point of the resin, whereby the cylindrical foam sheet shrinks toward the central axis of the cylinder formed by the sheet and intimately contacts the circumferential side wall of the molding form to form a bottomless or gathered cylindrical article; and compression-molding the article under heat to form a thermostatic resin foam receptacle.

14 Claims, 38 Drawing Figures

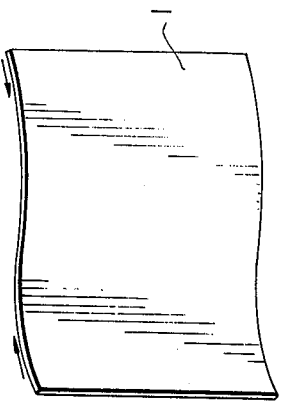
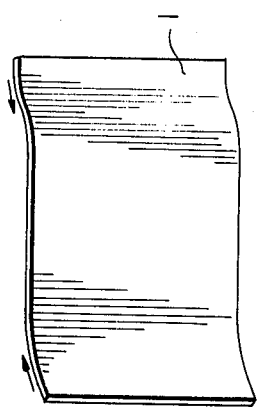
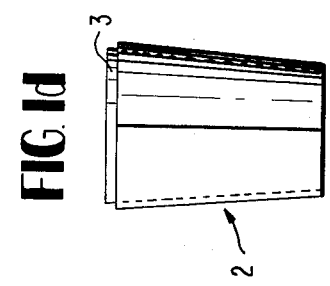
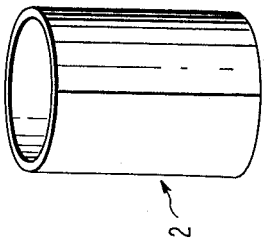
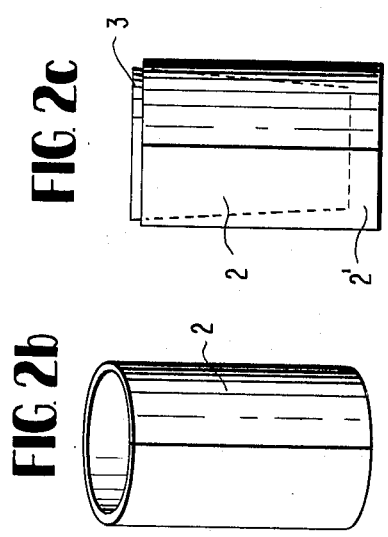
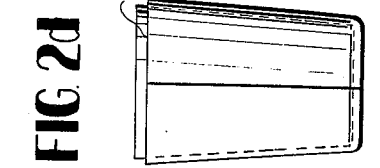
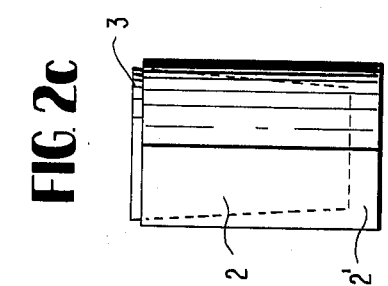
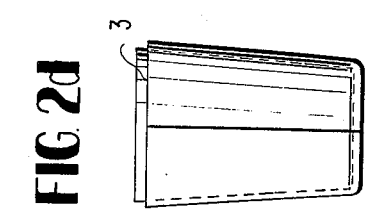
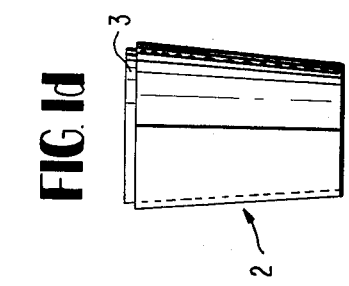
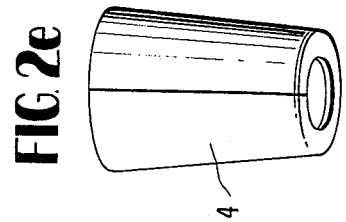
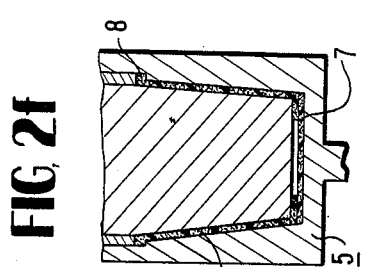
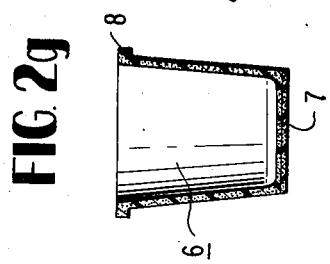
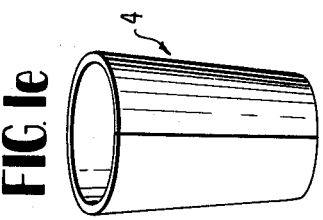
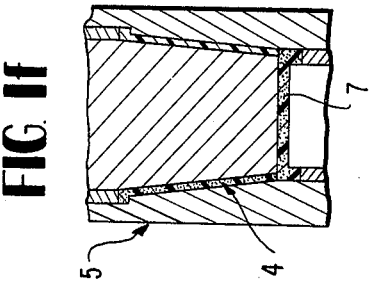
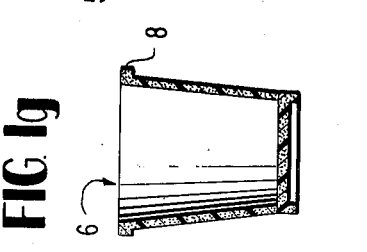

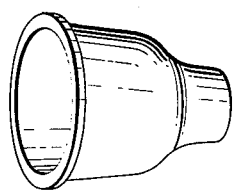
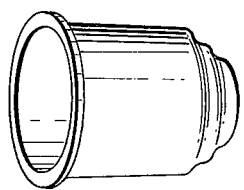
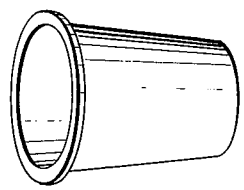
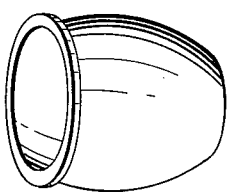
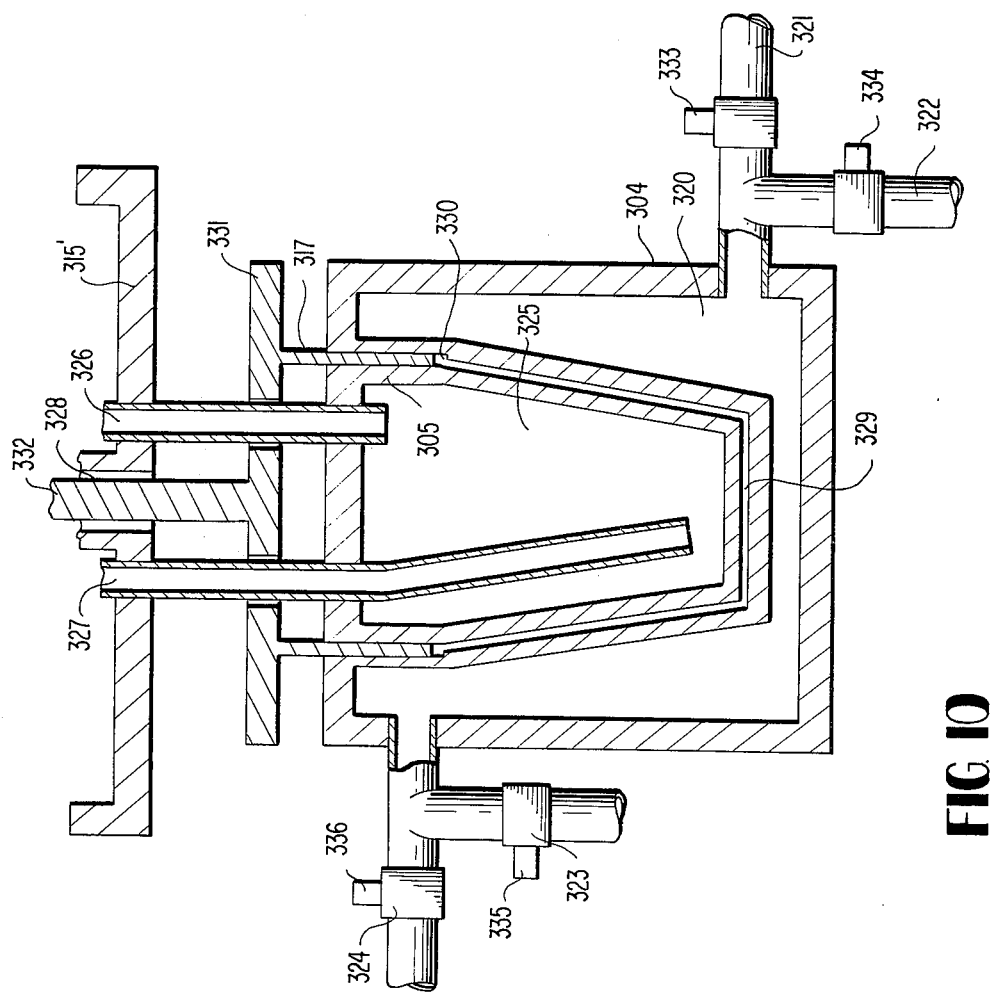

METHOD FOR PRODUCING RECEPTACLES FROM THERMOPLASTIC RESIN FOAM SHEET

BACKGROUND OF THE INVENTION

1. Field of the Invention

This invention relates to a method for producing receptacles from a thermoplastic resin foam sheet. More specifically, this invention relates to a very easy and efficient method for producing receptacles having a deep bottom, receptacles whose mouth and bottom are different in diameter, and receptacles having complicated shapes, using a uni-directionally shrinkable thermoplastic resin foam sheet which, upon application of heat, shrinks in one direction to a greater extent than in directions perpendicular to that direction.

2. Description of the Prior Art

Previously, the manufacture of receptacles from thermoplastic resin sheets has been effected exclusively by vacuum molding or compression-molding of a flat foamed sheet using a pair of molds in which the mold cavity corresponds to the shape of the desired receptacle. Since the receptable obtained by such a method is a product in which the side wall and the bottom are integrally molded from the thermoplastic resin foam sheet having good heat insulation, one can hold it with the hand even when a very hot liquid such as water or beverage is poured into it. However, since the molding involves heat-softening the thermoplastic resin foam sheet and forceably elongating the foam sheet, and since the elongation of the foam sheet is limited, the peripheral side wall or the bottom of the receptacle becomes thin and its strength decreases. Consequently, receptacles having a height larger than the diameter of its open end, i.e., receptacles with deep bottoms cannot be obtained. Furthermore, with such a conventional technique, it is almost impossible to obtain receptacles of complicated shapes.

In Japanese Laid-Open Patent Publication No. 31270/73 a method is proposed which is an improvement over the above described conventional method and which makes it possible to produce receptacles having a deep bottom without a bonding adhesive. Briefly, this method comprises bending into a cylindrical form a frustosectoral or rectangular thermoplastic resin foam sheet which when bent in a cylindrical form, has a substantially larger height than its diameter, sealing the side edges of the sheet to form a lapped seam and a longitudinal side wall, and bonding a bottom plate consisting of the same kind of thermoplastic resin foam sheet as the side wall to the inner bottom part of the side wall thereby to form a cylindrical receptacle. Since according to this method, a frustosectoral or rectangular thermoplastic resin foam sheet is bent into a cylindrical form and the edges of the foam sheet are merely heat-sealed, it is possible to produce a desired cylindrical receptacle with a deep bottom and having a larger height than its diameter. However, when, for example, a cup having a mouth with a different diameter from that of its bottom is to be formed by such a method, the foam sheet which constitutes the side wall of the receptacle assumes a complicated shape such as a frustosectoral shape. Consequently, it is time-consuming to punch out a foam sheet for producing the side wall of such a receptacle from a large-sized stock of foam sheet, and the efficiency of using the stock is low and there is a great waste of the foam sheet material. Thus, this method is very disadvantageous from an economic point of view. Such a defect becomes even greater as the shape of the cup becomes more special. For example, in the production of a receptacle having a polygonal mouth edge and a circular bottom or a receptacle having a diameter abruptly decreasing from the central part of the side wall toward the bottom, not only is the efficiency of using the stock of the foam sheet reduced, but also it is extremely difficult to form receptacles of the desired shape.

SUMMARY OF THE INVENTION

It has now been found that the above defects can be completely eliminated by a method for producing receptacles having a deep bottom or complicated shapes with great ease and efficiency using a uni-directionally shrinkable thermoplastic resin foam sheet which upon application of heat, shrinks in one direction to a greater extent in other directions perpendicular to that direction.

According to this invention, there is provided a method for producing receptacles of a thermoplastic resin foam sheet, which comprises bending into a cylindrical form a rectangular-shaped uni-directionally shrinkable thermoplastic resin foam sheet which when heated, shrinks in one direction to a greater extent than in other directions perpendicular to that direction, so that when heated, the foam sheet will shrink toward the central axis of the cylinder; bonding the side edges of said sheet; putting the cylindrical foam sheet over the molding form and heating the foam sheet to a temperature above the softening point of the foam sheet to allow the cylindrical foam sheet to shrink toward the central axis of the cylinder and bring it into intimate contact with the circumferential side wall of the molding form to form a bottomless cylindrical article; inserting the resulting cylindrical article in a mold comprising a male mold member and a female mold member together with a bottom plate; and compression-molding the article under heat thereby to bond the bottom plate to the bottom of the cylindrical article.

According to another aspect of this invention, there is provided a method for producing receptacles of a thermoplastic resin foam sheet, which comprises bending into a cylindrical form a rectangular-shaped uni-directionally shrinkable thermoplastic resin foam sheet which when heated, shrinks in one direction to a greater extent than in other directions perpendicular to that direction, so that when heated, the foam sheet will shrink toward the central axis of the cylinder and extend beyond at least the bottom surface of a molding form; bonding both side edges of the sheet; putting the resulting cylindrical foam sheet over the molding form; heating the foam sheet to a temperature above the softening point of the foam sheet to allow the cylindrical foam sheet to shrink toward the central axis of the cylinder and bring it into intimate contact with the circumferential side wall of the molding form; further bending the bottom circumferential edge of the cylinder which extends beyond the molding form toward the bottom surface of the molding form to cover the circumferential bottom edge of the molding form; inserting the resulting shrunken cylindrical article into a mold comprising a male mold member and a female mold member; and compression-molding the article under heat thereby to bond the bottom plate to the bottom of the cylindrical article.

According to still another aspect of this invention, there is provided a method for producing receptacles of a thermoplastic resin foam sheet, which comprises bending into a cylindrical form a rectangular-shaped uni-directionally shrinkable thermoplastic resin foam sheet which when heated, shrinks in one direction to a greater extend than in other directions perpendicular to that direction, so that when heated, the foam sheet will shrink toward the central axis of the cylinder and extend beyond at least the bottom surface of a molding form; bonding both edges of the foam sheet; putting the cylindrical foam sheet over the molding form; heating the cylindrical foam sheet to a temperature above the softening point of the foam sheet to allow it to shrink toward the central axis of the cylinder and bring it into intimate contact with the side circumferential wall of the molding form; further gathering inwardly that bottom portion of the cylinder which extends beyond the molding form to cover the entire area of the bottom surface of the molding form; and then compression-molding the resulting shrunken cylindrical article within a mold comprising a male mold member and a female mold member.

BRIEF DESCRIPTION OF THE ACCOMPANYING DRAWINGS

FIGS. 1 to 4 are views illustrating the embodiments of producing receptacles of a thermoplastic resin foam sheet in accordance with this invention;

FIG. 10 is a enlarged schematic sectional view of the molding machine in FIG. 9 to better illustrate the interior construction thereof; and FIG. 11 is perspective views of embodiments of receptacles in accordance with the method of this invention.

DETAILED DESCRIPTION OF THE INVENTION

Figure 4A:
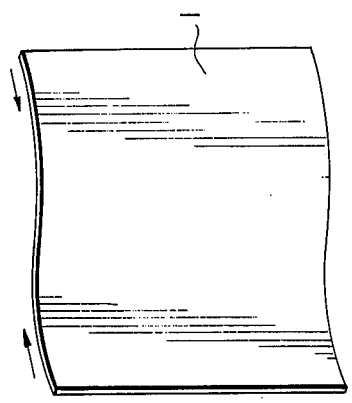
Figure 4D:
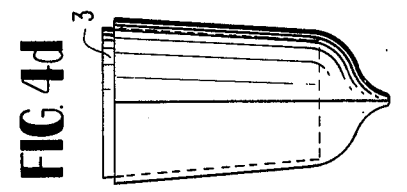

The thermoplastic resin foam sheet used in the method of this invention can be one prepared, for example, by adding an easily volatile blowing agent such as butane, pentane, isobutane, propane, hexane, gaseous halogenated hydrocarbons and the like or a chemical blowing agent such as azodicarbonamide, dinitrosopentamethylene tetramine, azodiisobutyldinitrile and sodium bicarbonate to a polymeric material such as polystyrene, methyl methacrylate polymer, styrene-acrylonitrile copolymer, styrene-methyl methacrylate copolymer, styreneacrylonitrile-butadiene copolymer, a mixture thereof, and a mixture thereof with polyethylene, polypropylene, polyvinyl chloride and the like, a copolymer of styrene with methyl methacrylate or acrylonitrile, poly(methyl methacrylate), polyethylene, polypropylene, or polyvinyl chloride, and foaming and molding the mixture using an extruder, for instance. It is necessary that the foam sheet used in the method of this invention should shrink to a large extent in one direction only when heated to a temperature above the softening point of the sheet, and, in another direction intersecting this direction at right angles, the extent of the shrinkage should be very small, or the sheet should not shrink at all, or it should not shrink but just swell slightly. A foam sheet having these properties will be referred to in this specification and in the appended claims as a unidirectionally shrinkable thermoplastic resin foam sheet. Such a foam sheet can be obtained by heat-softening a thermoplastic resin foam sheet followed by stretching the sheet to the extent of more than 1.5 times the original size of the sheet before heating or by appropriately varying a blow-up rate or a stretching rate during the extrusion operation of the foam sheet.

More specifically, the extent of the shrinkage of the foam sheet is such that when it is heated at 135°C for 5 seconds, the shrinkage of the sheet in one direction is at least 1.5 times, preferably 2.0 to 6.0 times, the shrinkage in another direction intersecting this direction at right angles, and the shrinkage factor in the direction of major shrinkage is at least 15%, preferably 30 to 60%. When such a foam sheet is shaped into a cylindrical form with its major shrinkage direction aligned in the circumferential direction of the cylinder, and the minor shrinkage direction as the direction of the generating line of the cylinder, and is heated to a temperature above the softening point of the sheet, generally from about 30° to about 130°C, the inside diameter of the cylinder reduces greatly, but the length of the cylinder in the direction of the generating line does not change so much. A uni-directionally shrinkable foam sheet prepared from a resin such as polystyrene, methyl methacrylate and copolymers thereof can be most suitably used since it has rigidity and can be effectively used for producing a cylindrical article by bending the polystyrene resin sheet.

A suitable thickness of the thermoplastic resin foam sheet which can be used in the method of this invention is about 0.25 to 2 mm. If the thickness is less than about 0.25 mm, the rigidity of the sheet is weak and the strength required for the cylindrical article cannot be obtained. Furthermore, use of a thickness less than 0.25 mm is disadvantageous since, when the sheet is shrunken by heating to a large extent, the sheet is broken. On the other hand, if the thickness is more than 2 mm, the sheet is not as flexible because of its strong rigidity, and the sheet cannot be used for forming a cylindrical article of a small diameter.

Furthermore, the foam sheet used in the method of this invention suitably has a density of not more than about 0.4 g/cc. Since the rigidity of the foam sheet decreases with decreasing density, foamed sheets having a density of 0.4 to 0.06 g/cc can be preferably used.

The uni-directionally shrinkable foamed sheet used in this invention is cut into a rectangular shape beforehand. In conventional methods, the foam sheet has been cut into a frustosectoral form, and therefore, it has been necessary to punch out a frustosectoral shape from a stock sheet. This complicates the overall process, and also loss of the material occurs due to the punching. In contrast, in the method of this invention, the material is merely cut into a rectangular shape, and this simplifies the overall process with no loss at all of the material due to cutting. The method of this invention has a further advantage that since the sheet cut into a rectangular shape is shrunken by heating as such, the volume reduction of the sheet at the shrunken part occurs, and the strength of the foam sheet is increased.

The bottom plate used in the method of this invention can, for example, be a polystyrene resin foamed sheet, a paper sheet, or a polyvinyl chloride sheet. It is especially preferred that the thermoplastic resin foam sheet used as the material of the receptacle and the material of the bottom plate be the same, since this brings about an increase in bond strength.

The shape of the bottom plate can, for example, be a shape which conforms to the bottom of the shrunken cylinder mounted on the mold, or a shape molded so as to have a circumferential leg portion and cut into a shape which conforms to the bottom part.

The invention will be described in greater detail below with reference to the accompanying drawings.

The method of this invention will first be described by referring to FIGS. 1 to 4. The reference numeral 1 represents a uni-directionally shrinkable thermoplastic resin foam sheet which is cut into a rectangular shape and which when heated, shrinks to a larger extent in one direction than in a direction perpendicular to that direction. The major shrinking direction of this foam sheet 1 is shown by an arrow (FIG. 1a). The foam sheet 1 is bent into a cylindrical form so that when the sheet is heated to a temperature above the softening point of the sheet, the sheet will shrink toward the central axis of the cylinder, and the side edges of the sheet 1 are overlapped. A heating device at a temperature of about 130° to 200°C is applied to the overlapped area of the sheet 1 to heat-seal the seam to form a cylindrical body 2 (FIG. 1b). The lap seam may be made with a bonding adhesive applied to the facing surfaces of overlapping edges of the sheet 1. Then, this cylindrical body 2 is placed on a molding form 3 having an outer shape corresponding to the inner surface of the desired receptacle as a final molded article. In this state, the cylindrical body 2 is placed in a hot air oven, and heated at a temperature of about 110° to 250°C for about 3 to 15 seconds (FIG. 1c). Thus, the cylindrical body 2 shrinks toward the central axis of the cylinder and intimately contacts the circumferential side wall of the molding form 3 (FIG. 1d). Then, the shrunken cylindrical body 2 is removed from the form 3 to obtain a bottomless cylindrical body 4 (FIG. 1e). This cylindrical body 4 is inserted into a mold 5 comprising a male mold member and a female mold member together with a bottom plate 7 conforming to the size of the lower bottom edge of the cylindrical body 4, and then compressed under heat by steam or other heating medium at a temperature in the range of from about 110° to about 150°C. The pressure varies depending upon thickness, time of foaming of the foam sheet or a pressure applied at which a rib is formed. For instance, the thinner the foam sheet or the higher the time of foaming, the lower the pressure (FIG. 1f). By compression under heat, the bottom plate 7 is meltbonded to the lower bottom edge to form a receptacle 6 with a bottom (FIG. 1g).

In the step of compression molding the cylindrical body 4 within the mold 5 under heat, it is generally preferred to provide on the receptacle 6 a rib 8 at the mouth by pressforming the upper mouth edge of the cylindrical body 4. This serves to increase the holding strength of the receptacle.

In the embodiments shown in FIGS. 2 and 3, the lower portion 2' of the cylindrical body 2 extends beyond the molding form 3 at the time when the cylindrical body 2 is placed on the form 3. The foam sheet 1 used is longer than that shown in FIG. 1 (as shown in FIG. 2a and FIG. 3a). As described above, the edges are overlapped to form a cylindrical body 2 which is longer than the cylindrical body in FIG. 1 in the direction of the cylinder generating line (as shown in FIG. 2b and FIG. 3b). The cylindrical body 2 is placed on the form 3 so that the lower portion 2' of the cylindrical body 2 extends beyond the form 3 (as shown in FIG. 2c and FIG. 3c). After placing the cylindrical body 2 on the form 3, the cylindrical body is heated at the above-described temperature for an appropriate period of time, and the lower portion 2' extending beyond the form 3 is bent only at its peripheral edge toward the bottom to cover the peripheral edge of the bottom surface and to cause the side wall of the cylindrical body 2 to make intimate contact with the form 3 (as shown in FIG. 2d and FIG. 3d). Then, the shrunken cylindrical body 4 is removed from the form 3 (as shown in FIG. 2e and FIG. 3e). The cylindrical body 4 is then compression-molded under heat within the mold 5 comprising a male mold member and a female mold member. At the time of this compression-molding, the bottom plate 7 is coalesced in FIG. 2 with the outside of the peripheral bottom edge bent inwardly of the cylindrical body 4, and in FIG. 3 with the inside of the peripheral bottom edge (FIG. 2f and FIG. 3f). Thus, receptacles 6 with a bottom are formed.

Figure 4C:
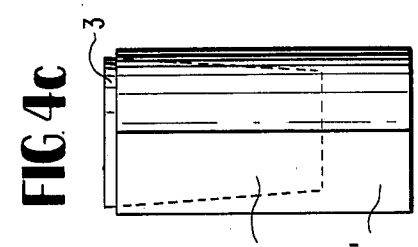
Figure 4B:
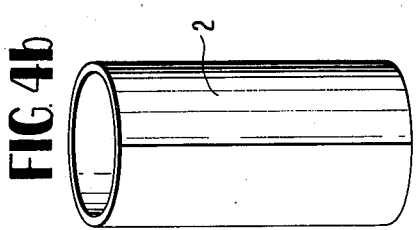

In FIG. 4, the lower portion 2' of the cylindrical body 2 extends beyond the form 3 (as shown in FIG. 4c) to a greater extent than in FIGS. 2 and 3. The foam sheet 1 in FIG. 4a is cut longer than the foam sheets shown in FIGS. 2 and 3a. Both edges of the foam sheet are heat-sealed in FIG. 4b to form a cylindrical body 2 which is longer in the direction of the generating line of the cylinder than the cylindrical bodies shown in FIGS. 2 and 3b. The cylindrical body 2 is then placed on the form 3 as shown in FIG. 4c. The lower portion 2' of the cylindrical body 2 placed on the form 3 extends beyond the form 3 by the length larger than the radius of the lower portion of the form 3. Then, the cylindrical body on the form 3 is placed in a hot air oven and heated at about 110° to 250°C for about 3 to 15 seconds. Thus, the cylindrical body 2 shrinks toward the central axis of the cylinder and intimately contacts the circumferential side wall of the form 3. At this time, the bottom portion 2' which extends beyond the form 3 is gathered inwardly of the cylinder and covers substantially the entire area of the bottom surface of the form 3 as shown in FIG. 4d. Then, the heated and shrunken cylindrical body 4 is removed from the form 3 as shown in FIG. 4e and the cylindrical body 4 is compression-molded under heat within the mold 5 comprising a male mold member and a femal mold member as shown in FIG. 4f. When the cylindrical body 4 is compression-molded under heat, the bottom portion 4' of the cylindrical body 4 gathered around the bottom surface is softened and melted and partly made into resin to form the bottom of the receptacle. Thus, receptacle 6 having a bottom can be obtained as shown in FIG. 4g. Accordingly, in the embodiment shown in FIG. 4, a bottom plate such as used in FIGS. 1 to 3 is not required.

In the embodiments illustrated in FIGS. 1 to 4, the receptacle 6 is produced by forming cylindrical body 2 from uni-directionally shrinkable synthetic resin foam sheet 1, placing the cylindrical body 2 on the form 3, heating the cylindrical body to allow it to shrink to form cylindrical body 4, and then compression-molding the cylindrical body 4 under heat within the mold 5 comprising a male mold member and a female mold member. It is possible to simplify the above molding step by using the male mold member of the mold 5 as the form 3. According to this modification, a uni-directionally shrinkable thermoplastic resin foam sheet is cut with a cutting blade into a rectangular shape and both edges of the sheet are heated; the foam sheet is bent into a cylindrical form and wrapped around a male mold member having a shape conforming to the inside surface of the desired receptacle; both edges of the foam sheet are melt-sealed to form a cylindrical body; the cylindrical body is heated to allow it to shrink onto the male mold member; if desired, a bottom plate is inserted in this condition; and then the male mold member is inserted into a female mold member to perform the compression-molding under heat, thereby easily forming receptacles 6.

Now, the process of manufacturing a receptacle having a larger height than the diameter of the upper mouth edge of the receptacle with the diameter of the upper mouth edge being different from that of the bottom using a uni-directionally shrinkable thermoplastic resin foam sheet will be described by referring to FIGS. 5 to 10.

Figure 5:
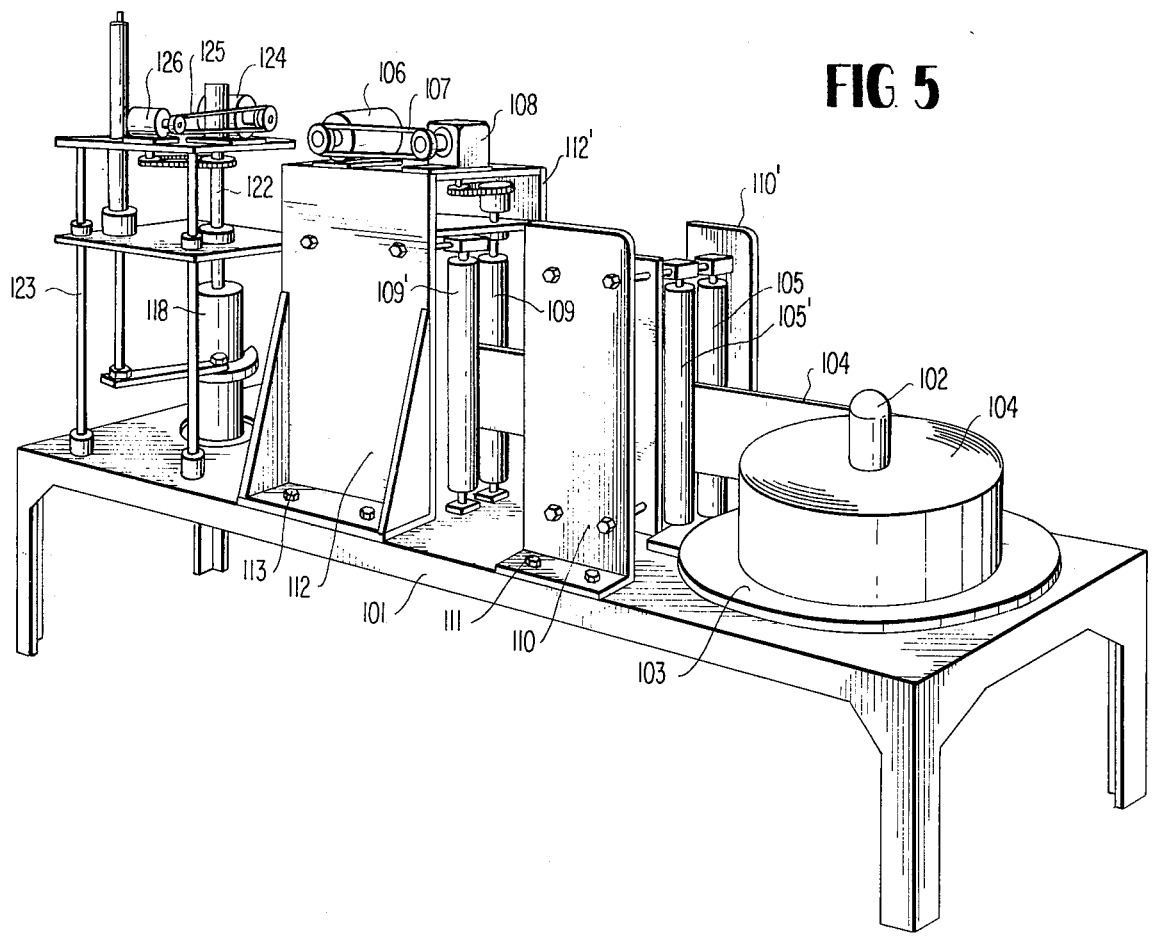
FIG. 5 is a perspective view of an embodiment of the apparatus for forming a cylindrical article of a thermoplastic resin foam sheet.

Referring to FIG. 5, a uni-directionally shrinkable thermoplastic resin foam sheet in a roll form is wound around a shaft 102 of a rotatable turntable 103 on a stand 101. Then, the end portion of the foam sheet 104 is inserted between a pair of nip rolls 105 and 105' made of rubber and rotating together with a pair of nip rollers 109 and 109' made of metal by means of a belt (not shown). The nip rollers 109 and 109' rotate through a change gear 108 driven by a motor 106 and connected through the motor 106 and a belt 107. Thus, the foam sheet 104 advances forwardly by the driving of the drive motor 106. The nip rolls 105 and 105' are fixed by side plates 110 and 110' respectively, and the nip rolls 109 and 109' are also fixed by side plates 112 and 112' respectively. These side plates 110, 110' and 112, 112' are secured to the stand 101 by means of bolts 111 and 113 respectively. It is possible to drive only one of the nip rollers in each pair, for example only the nip rolls 105 and 109. When both are rotated, it is necessary to rotate the rolls 105, 109 in a reverse direction to the nip rolls 105', 109'. The nip rolls 105, 105' have a larger diameter than the nip rolls 109, 109', but the peripheral speed of the nip rolls 109, 109' is slightly higher than that of the nip rolls 105, 105'.

Figure 6:
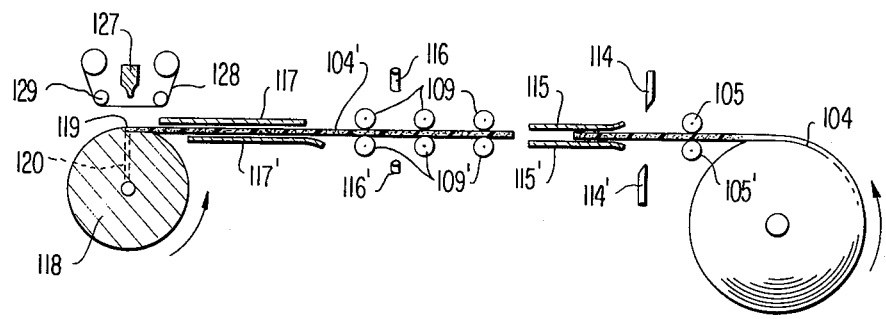
FIG. 6 is a schematic horizontal sectional view of FIG. 5.

The distance between the nip rolls 105 and 105' and between the nip rolls 109 and 109' is defined by the thickness of the foam sheet 104. If the thickness of the foam sheet 104 is 1 mm, the clearance between the nip rollers is set at 1 mm. In one modification, the nip roll 105' alone is urged by compressed air. As shown in FIG. 6, the nip rolls 109, 109' are provided in three parallel rows. These three rows of nip rolls 109 and 109' are connected by a chain (not shown) so that they rotate at the same speed.

The foam sheet 104 delivered by the rotation of the nip rolls 105, 105' passes between the nip rolls 109, 109' engages the nip rolls 109, 109'. Since, however, the delivering speed of the nip rolls 105, 105' is slightly slower, the nip rolls 109, 109' advance the foam sheet 104 forwardly but with slipping due to the influence of the nip rolls 105, 105'.

Immediately rearward of the nip rolls 105, 105', cutters 114, 114' are provided as shown in FIG. 6. A pair of guide plates 115, 115' are provided between the cutters 114, 114' and the nip rolls 109, 109'. The cutters 114, 114' operate by an air cylinder (not shown). The air cylinder operates by a relay when the foam sheet 104 passes between photoelectric tubes 116, 116' provided between the nip rolls 109, 109'. Thus, the cutters 114 and 114' abut each other to cut the foam sheet 104.

When the foam sheet 104 is cut by the cutters 114, 114', the cut foam sheet 104' is delivered forwardly only by the rotation of the nip rolls 109, 109' without any influence of the nip rolls 105, 105'. The foam sheet 104' delivered by the nip rolls 109, 109' passes between guide plates 117, 117', and the leading edge of the foam sheet 104' abuts a chuck portion 119 provided on a cylindrical molding form 118. A vacuum hole 120 is provided in the chuck portion 119, and communicates with a vacuum generating device (not shown) separately provided through the vacuum hole 120. Accordingly, the leading edge of the foam sheet 104' abutting the chuck portion 119 is sucked by the vacuum hole 120 and secured there.

The molding form 118 is fixed by a shaft 122 extending upwardly, and a gear is mounted on the forward end of the shaft 122. A drive motor 124 is provided on a frame 123, and a change gear 126 is secured through a belt 125. The change gear 126 is adapted to mesh with the gear secured to the shaft 122. The change gear 126 is of the type in which some of the teeth have been machined off and is always rotating. The molding form 118 rotates when in contact with the change gear 126, but is prevented from rotation upon contact with the machined part of the gear. The molding form 118 is so designed that when it rotates once, it always stops at the position shown in FIG. 6. When the machined part of the gear has passed, and the form 118 again meshes with the teeth of the change gear, the form 118 rotates once by the operation of the gear 126, and stops again at the original position. When the leading edge of the foam sheet 104' is sucked by the vacuum hole 120, the form 118 rotates once by the operation of the change gear 126, and during this time, the vacuum is always maintained in the vacuum hole 120.

Since the foam sheet 104' is of a size slightly longer than the circumference of the form 118, when the form 118 rotates once, both edges of the foam sheet 104' are overlapped. When the form 118 stops and edges of the foam sheet 104' are overlapped, a heating device 127 presses the overlapped area of the foam sheet 104' by the operation of an air cylinder (not shown). Since the heating device 127 is heated at a temperature above the softening point of the foam sheet 104', that is at a temperature of about 110° to 200°C, the part pressed by the heating device 127 is melt-sealed. Thus, both edges of the foam sheet 104' are bonded, and a cylindrical body 130 is formed on the circumference of the form 118, as shown in FIG. 7.

If the heating device 127 directly abuts the foam sheet 104', the foam sheet 104' melt-sticks to the heating device 127. Accordingly, in order to prevent this disadvantage, a sheet 128 made of a tetrafluoroethylene resin is interposed between the heating device 127 and the foam sheet 104'. A stretchable roll 129 is provided to support the sheet 128. Thus, when the heating device 127 projects towards the foam sheet 104' by the operation of the air cylinder, for example, the sheet 128 also projects.

Figure 7:
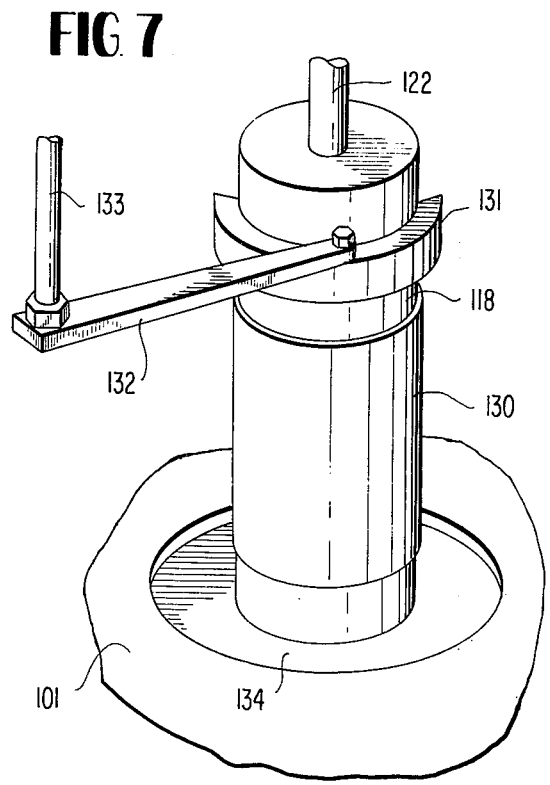
FIG. 7 is an enlarged perspective view of a molding form in FIG. 5 to better illustrate the construction thereof.

In FIG. 7, the reference numeral 131 represents a stripping member which is in contact with the upper circumference of the form 118. The stripping member 131 is adapted to slide by the up-and-down sliding movement of a piston rod 133 of the air cylinder through an arm 132.

The cylindrical body 130 formed on the form 118 by the heating device 127 is subjected to the operation of the piston rod 133 and is removed from the molding form 118 by the stripping member 131 through a hole 134 provided on the stand 101 and simultaneously drawn off downwardly.

Figure 8:
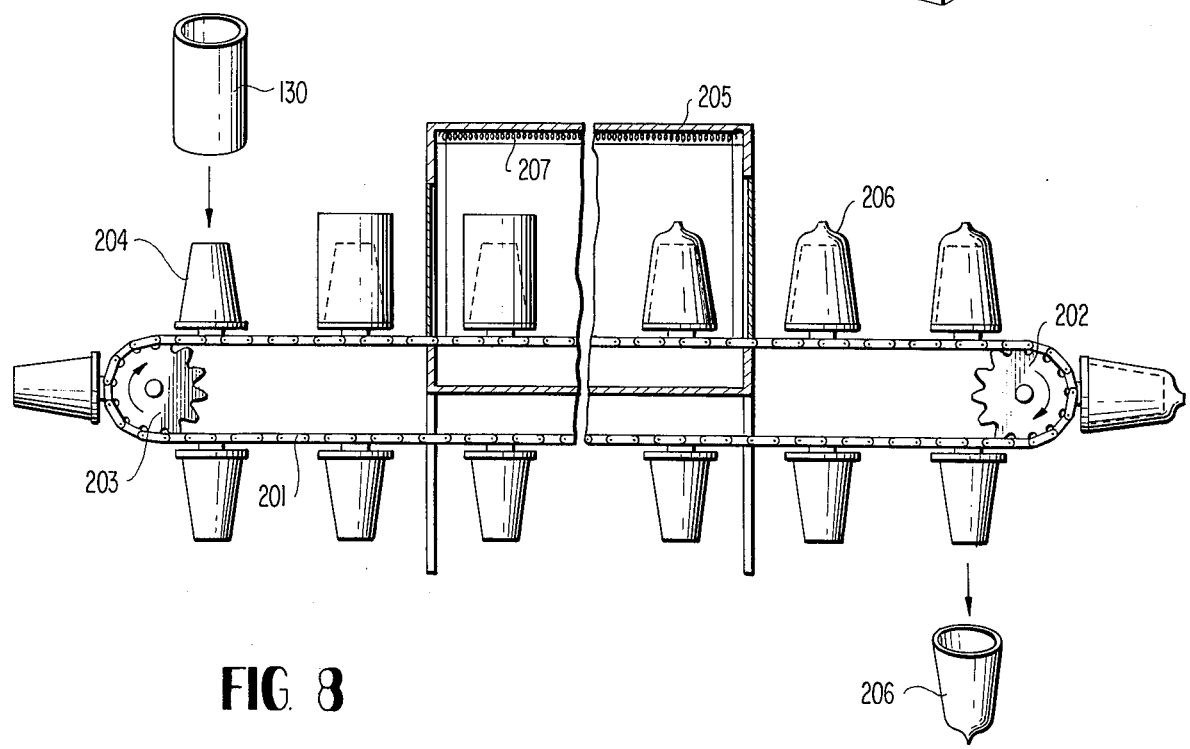
FIG. 8 is a partly sectional schematic elevational view of an embodiment of the apparatus for forming a shrunken cylindrical article of a thermoplastic resin foam sheet in accordance with the method of this invention.

The cylindrical body 130 drawn off from the molding form 118 by the stripping member is placed on a conical molding form 204 on a conveyor as shown in FIG. 8.

Referring now to FIG. 8, the reference numeral 201 represents an endless conveyor which is adapted to advance in the direction of an arrow by gears 202 and 203 connected to a drive motor (not shown). A plurality of conical molding forms 204 are secured to the conveyor 201 at suitable intervals. A hot air oven 205 is provided at about the center of the conveyor 201, and maintained at an appropriate temperature using a nichrome wire heater 207. Each of the forms 204 has a slightly smaller outside diameter than the inside diameter of the cylindrical body 130. The cylindrical body 130 is placed on one of the forms 204 which are being driven, and advances in the right direction in FIG. 8 by the driving of the gears 202 and 203. Then, the form 204 having thereon the cylindrical body 130 enters the hot air oven 205, and upon being heated there, the cylindrical body 130 shrinks inwardly and firmly adheres to the peripheral wall of the form 204. The temperature of the inside of the hot air oven 205 is kept at about 130° to 220°C, and the time of passage through the hot air oven 205 is about 3 to 10 seconds. Heating to a greater extent is undesirable since it results in a shrinkage in the direction of the generation line of the cylindrical body 130.

After passage through the hot air oven 205, a shrunken cylindrical body 206 is obtained in which the portion projecting from the molding form 204 is bent inwardly of the molding form 204 and the end portion is gathered. Then, the shrunken cylindrical body 206 is cooled, and when it has rotated through a half turn on the gear 202 and turned in the opposite direction, it is removed from the form 204. The removal of the shrunken cylindrical body 206 from the form 204 can be easily accomplished by blowing compressed air into the form 204, or by abutting a female mold member having substantially the same inside diameter as the outside diameter of the shrunken cylindrical body 206 and allowing the female mold member to function as vacuum chamber.

Figure 9:
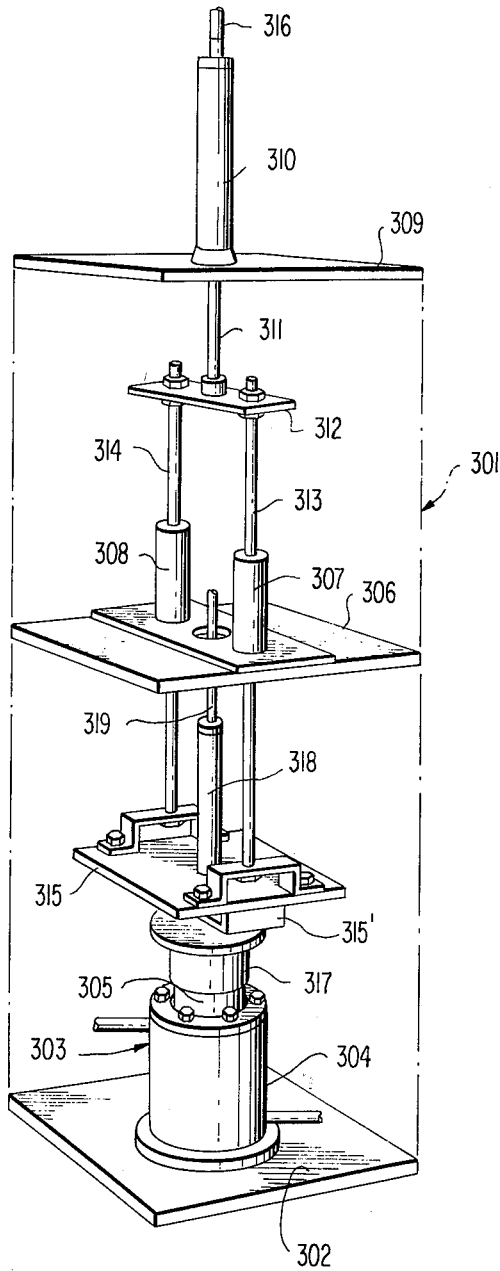
FIG. 9 is a perspective view of an embodiment of the molding machine equipped with a pair of male mold and a female mold in accordance with the method of this invention.

The shrunken body 206 that has been removed from the mold is compression-molded in a molding machine, shown in FIG. 9, equipped with a male mold member and a female mold member.

In FIG. 9, the reference numeral 301 represents a frame, and a bottom plate 302 is secured to the lowermost part of the frame 301. A molding machine 303 is mounted on the bottom plate 302. The molding machine 303 is constructed of a female mold member 304 and a male mold member 305. A plate 306 is fixed at an intermediate stage of the frame 301, and cylindrical tubular bodies 307, 308 are secured to the plate 306. The opening through cylindrical tubular bodies 307 and 308 extends vertically. A plate 309 is fixed at the uppermost stage of the frame 301. A vertically sliding cylinder 310 is mounted on the plate 309. A piston rod 311 is fitted in the cylinder 310, and a plate 312 is secured to the forward end of the piston rod 311. Sliding rods 313 and 314 extend through the cylindrical tubular bodies 307 and 308 respectively with the rod 311 therebetween. The lower ends of the sliding rods 313 and 314 are secured to a back plate 315 fitted to the male mold member 305 through a U-shaped frame 315'. Accordingly, by the operation of the cylinder 310, the male mold member 305 moves up and down.

The reference numeral 316 designates a pipe through which air or oil is injected or discharged to slide the piston rod up and down. A rib-forming member 317 is fitted to the male mold member 305. The rib-forming member 317 slides up and down around the male mold member 305 by the actuation of the cylinder 318. Another pipe 319 having the same function as the pipe 316 is provided.

FIG. 10 shows an enlarged schematic sectional view of the molding machine 303. The inside of the female mold member 304 is an empty chamber 320. The female mold member 304 is heated or cooled by introducing a heating medium such as steam or a cooling medium such as water from a heating medium introduction inlet 321 or a cooling medium introduction inlet 322 provided at the lower part of the female mold member 304. The heating medium or the cooling medium is discharged from a discharge outlet 323 or 324 respectively.

An empty chamber 325 is provided inside the male mold member 305. The male mold member 305 is connected to the U-shaped frame 315' which is formed integrally with the back plate 315. In order to heat or cool the male mold member 305, an introduction inlet 326 for a heating medium or cooling medium and a discharge pipe 327 for a heating medium or cooling medium are secured to the male mold member 305 so as to project into the empty chamber 325.

A hole 328 is perforated at the central part of the U-shaped frame 315'. A mold cavity 329 is formed between the female mold member 304 and the male mold member 305. This mold cavity 329 has the same size as that of a receptacle to be obtained by the method of this invention. A slightly large hollow part 330 is provided at the upper part of the mold cavity 329 in order to form a rib on the receptacle. The ribforming member 317 is fitted in the hollow part 330 which presses at the mouth of the receptacle to form a rib. The rib-forming member 317 is secured integrally with a plate 331 and connected to the piston rod 332 of the cylinder 318 through hole 328 of the U-shaped frame 315'. By the vertical sliding movement of the piston rod 332, the rib-forming member 317 slides within the hollow part 330.

The cylinder 310 is operated to maintain the female mold member 304 and the male mold member 305 of the molding machine 303 in the open state, and the cylinder 318 is actuated to raise the rib-forming member 317. In this state, the shrunken cylindrical body 206 is inserted in the female mold member 304. After insertion, a valve 334 for introducing a cooling medium and a valve 336 for discharging the cooling medium are closed, and simultaneously, a valve 333 for introducing a heating medium and a valve 335 for discharging the heating medium are opened. Thus, a heating medium is introduced into the empty chamber 320 of the female mold member 304 through the pipe 321. At the same time as the heating of the female mold member 304, a heating medium is introduced into the empty chamber 325 of the male mold member 305 through the pipe 326 thereby to maintain the male mold member 305 at a similar temperature to that in the female mold member 304. Subsequently, the cylinder 310 is actuated to project the piston rod 311 and thus to insert the male mold member 305 in the female mold member 304 and simultaneously to press it. Then, the gathered part of the bottom of the shrunken cylindrical body 206 is softened and melted by the heat of the male mold member 305 and the female mold member 304, and by the compression of the mold members, the gathered part is formed into a flat bottom plate of the receptacle.

After pressing with the male mold member 305, the cylinder 318 is actuated to project the rib-forming member 317 downwardly to press the mouth edge part of the shrunken cylindrical body 206. By the pressing of the rib-forming member 317, that part of the shrunken cylindrical body 206 which is in the hollow part 330 is heated by the female mold member 204 and the male mold member 305, whereupon that part is softened and melted and it reduces in volume to form a rib.

After the formation of the rib, the valves 333 and 335 are closed and simultaneously, the valves 334 and 336 are opened. Then, the introduction of a heating medium through the pipe 326 is changed to the introduction of a cooling medium, and the cooling medium is introduced into the empty chambers 320 and 325 to cool the female mold member 304 and the male mold member 305. With this cooling medium introduction, the compression-molded receptacle in the mold cavity 329 is cooled.

After the cooling, the cylinders 310 and 318 are actuated to remove the male mold member 305 from the female mold member 304 and also to cause the rib-forming member 317 to retreat, and the compression-molded receptacle is removed.

In the manner described above, the receptacle 6 with a bottom and a rib 8 formed at its upper mouth edge can be obtained from a uni-directionally shrinkable thermoplastic resin foam sheet cut into a rectangular shape in advance.

According to the method of this invention described above, receptacles of deep bottoms can be easily obtained. As shown in FIG. 11, a to d, receptacles of complicated shapes such as a receptacle having different diameters between the top and the bottom (FIG. 11a), a receptacle having an abruptly diminishing diameter from the central part of the side wall toward the bottom (FIG. 11b), a receptacle with the central part of the side wall bulging (FIG. 11c), and a receptacle having a staged part at the bottom portion (FIG. 11d), can be easily and assuredly produced by only choosing the shape of the molding form 3 and/or the mold 5. Even these receptacles of complicated shapes can be molded from a rectangular shaped uni-directionally shrinkable thermoplastic resin foam sheet 1. It is easy to cut out the foam sheet 1 from the stock sheet, and the efficiency of using the stock sheet is extremely high, and any loss is very small. Therefore, the method of this invention is economically very advantageous, and can lead to a reduction in the cost of production. Thus, the method of this invention brings about excellent advantages.

The method of this invention will be described more specifically by reference to the following examples illustrating the manufacture of receptacles from a uni-directionally shrinkable thermoplastic resin from the sheet. Unless otherwise indicated, all parts, percents, ratios and the like are by weight.

EXAMPLE 1

A uni-directionally shrinkable polystyrene resin foam sheet 104 having a thickness of 0.5 mm and a density of 0.2 g/cc which had a shrinkage factor of 27.5% in one direction and 57.4% in another direction intersecting the above direction at right angles and which was wound up in a roll form with the major shrinkage direction as a longitudinal direction was placed on turntable 103. Nip rolls 105 and 105' and 109 and 109' were actuated, and the distances between photoelectric tubes 116 and 116' and cutters 114 and 114' respectively were set at 230 mm. The cutters 114 and 114' were operated by the action of the photoelectric tubes 116 and 116' to cut off the foam sheet 104 as a rectangular sheet having a length of 155 mm and a width of 230 mm. The sheet 104' was further advanced and wound up on the cylindrical molding form 118. The device 127 heated at 180°C (above the softening point of this sheet) was brought into abutment with the overlapped area of the edges of the sheet 104' via a tetrafluoroethylene resin sheet 128 to melt seal the overlapped areas and thus to form a cylindrical body 130.

Figure 4E:
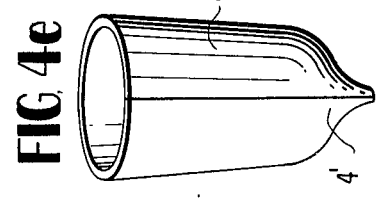
Figure 4F:
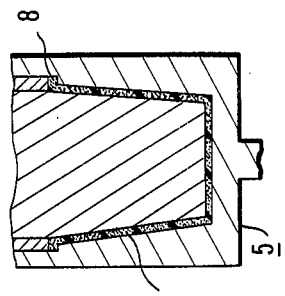
Figure 4G:
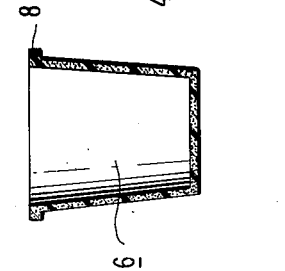
Figure 3A:
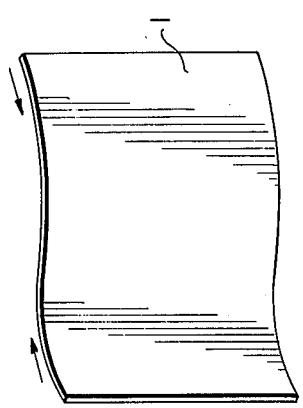
Figure 3D:
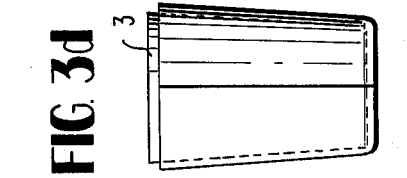
Figure 3C:
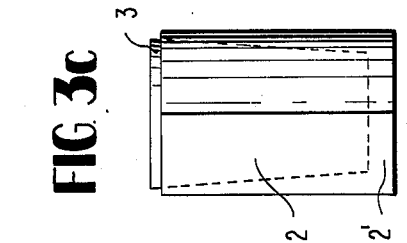
Figure 3B:
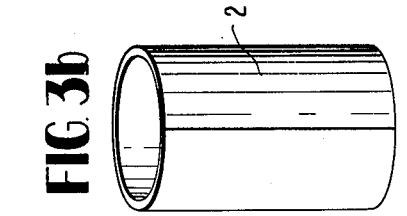
Figure 3E:
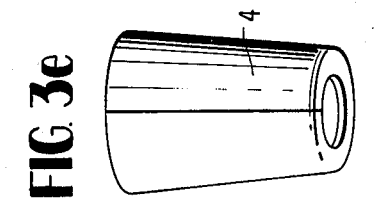
Figure 3F:
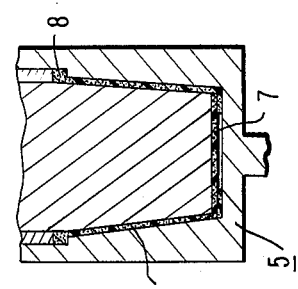
Figure 3G:
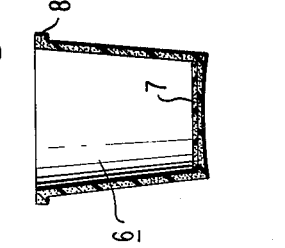

The cylindrical body 130 was stripped off from the molding form 118 by means of stripping member 131. Then, the cylindrical body 130 was placed on molding form 204 having the shape of a cup so that it extended by a length of 35 mm beyond the bottom surface of the molding form 204. Then, the cylindrical body 130 on the molding form 204 passed through hot air oven 205 held at 150°C with a residence time of 5 seconds by actuating the gears 202 and 203. During the passage, the cylindrical body 130 was caused to shrink by heat and the bottom part was gathered as shown in FIG. 4e and FIG. 8 thereby to form a shrunken cylindrical body 206. The shrunken cylindrical body 206 was removed from the molding form 204, and then placed in female mold member 304 of molding machine 303. Then, male mold member 305 was inserted in the female mold member 304 by the actuation of the cylinder 310, and simultaneously, steam heated at 120°C was fed into the empty chambers of the molds through inlets 321 and 326 at a pressure of 3 Kg/cm$^2$ for 12 seconds to compression-mold the shrunken cylindrical body 206. At this time, the upper part of the shrunken cylindrical body 206 was pressed over the length of 35 mm by means of rib-forming member 317. The female mold member 304 and the male mold member 305 were both cooled for 13 seconds by introducing water through the inlets 322 and 326 until the temperature reached room temperature. The male and female mold members were separated, and a cup 6 shown in FIG. 4g was withdrawn. This cup had a height of 90 mm, an inside diameter at the upper mouth edge of 70 mm, and an inside diameter at the bottom of 50 mm. It had a rib and different diameters between the top and bottom with a good outside shape. The cup had a deep bottom and the bottom was formed integrally with the body of the cup.

EXAMPLE 2

The same uni-directionally shrinkable polystyrene resin foam sheet as used in Example 1 was cut into a rectangular foam sheet 104 having a length of 130 mm and a width of 230 mm with the major shrinkage direction being the longitudinal direction. The sheet 104' was bent in the same manner as described in Example 1, and the side edges of the sheet 104' were heat sealed to form a cylindrical body 130. The cylindrical body 130 was then placed on a molding form 204 so that it extended beyond the bottom surface of the molding form 204 by a length of 10 mm, and in this state, was heat-shrunk for 5 seconds in a hot air oven 205 held at a temperature of 150°C. A shrunken cylindrical body as shown in FIG. 2e, was formed in with only the bottom peripheral edge was bent inwardly. A bottom plate 7 consisting of a polystyrene resin foam sheet with a thickness of 1.0 mm and a density of 0.1 g/cc and having a diameter of 50 mm previously had been placed in the female mold member 304. This shrunken cylindrical body was removed from the molding form 204, and placed in female mold member 304. Then, the male mold member 305 was inserted in the female mold member 304 and the shrunken cylindrical body was compression-molded by heat under quite the same conditions as used in Example 1 to form a cup 6.

This cup had an inside diameter at the upper mouth edge of 70 mm, an inside diameter at the bottom of 50 mm and a height of 90 mm. It had a rib and different diameters between the top and the bottom. The cup had a good outer shape, and the bottom plate was bonded firmly to the body of the cup.

EXAMPLE 3

In the same manner as in Example 2, a shrunken cylindrical body with only its bottom peripheral edge bent inwardly was formed as shown in FIG. 2e. A bottom plate 7 made of a polystyrene resin foam sheet having a shickness of 1.0 mm, a density of 0.1 g/cc and a diameter of 50 mm was placed on the inner peripheral bottom edge of the shrunken cylindrical body, and then this shrunken cylindrical body was placed at this state in female mold member 304. Then, male mold member 305 was inserted in the female mold member 304, and the shrunken cylindrical body was then compression-molded under quite the same molding conditions as described in Example 1 to form a cup 6.

This cup had an inside diameter at the upper mouth edge of 70 mm, an inside diameter at the bottom of 50 mm and a height of 90 mm. It had a rib and different diameters between the top and the bottom. Moreover, the cup had a good outer shape, and the bottom plate was firmly bonded.

EXAMPLE 4

The same uni-directionally shrinkable polystyrene resin foam sheet as used in Example 1 was cut into a rectangular foam sheet 104' having a length of 120 mm and a width of 230 mm with the larger shrinkage direction being the longitudinal direction using the apparatus as shown in FIGS. 5 to 8. The sheet 104' was bent in the same manner as described in Example 1, and both side edges were joined to form a cylindrical body 130. The cylindrical body 130 was then heat-shrunk using the apparatus as shown in FIG. 8 to form a cylindrical body 4 as shown in FIG. 1e, in which the bottom edge of the cylindrical body was in the same level as the bottom edge of the mold 5. The cylindrical body 4 was then placed in female mold member 304 of the mold as shown in FIGS. 9 and 10. A bottom plate 7 consisting of a polystyrene resin foam sheet with a thickness of 1.0 mm and a density of 0.1 g/cc and having a diameter of 50 mm had previously been placed in the female mold member 304. The male mold member 305 was then inserted in the female mold member 304, and the cylindrical body was compression-molded by heat under the same conditions as used in Example 1 to form a cup 6.

This cup had an inside diameter at the upper mouth edge of 70 mm, an inside diameter at the bottom of 50 mm and the height of 90 mm.

While the invention has been described in detail and with reference to specific embodiments thereof, it will be apparent to one skilled in the art that various changes and modifications can be made therein without departing from the spirit and scope thereof.

What we claim is:

1. A method for producing receptacles of a thermoplastic resin foam, which comprises the steps of:
    forming a cylinder of a rectangular-shaped unidirectionally shrinkable thermoplastic resin foam which, when heated, shrinks in a first direction to a greater extent than other directions perpendicular to said first direction, so that when heated, said thermoplastic resin foam sheet will shrink toward the central axis of said cylinder;
    bonding the side edges of said sheet forming said cylinder;
    heating said foam sheet on a male mold member of a mold comprising a male mold member and a female mole member, having a hollow part provided at the upper part of a mold cavity formed by said male mold member and said female mold member, and which can be heated and cooled to a temperature above the softening point of said resin, whereby said cylindrical foam sheet shrinks toward the central axis of said cylinder formed by said sheet and intimately contacts the circumferential side wall of said male mold member to form a bottomless cylindrical article, said male mold member being of a size such that a portion of said foam sheet extends beyond one end surface of said male mold member;
    further bending the circumferential edge of said cylinder formed by said sheet which extends beyond said end surface of said male mold member to circumferentially cover the edge of said male mold member;
    inserting the resulting cylindrical article on said male mold member into said female mold member together with a bottom plate for said bottomless cylindrical article so that the bottom portion of said cylindrical article is adjacent said bottom plate;
    compression-molding said article under heat thereby bonding said bottom plate to the bottom of said cylindrical article; and
    pressing the upper edge of said cylindrical article which is positioned at said hollow part under heat to form a rib which reduces a volume.

2. The method of claim 1, wherein said uni-directionally skrinkable thermoplastic resin foam sheet has a thickness of about 0.25 to 2 mm and a density of about 0.4 to 0.06 g/cc.

3. The method of claim 1, wherein the resin of said uni-directionally shrinkable thermoplastic resin foam sheet is a polystyrene resin.

4. The method of claim 1, wherein the resin material of said bottom plate is the same as the resin material of said uni-directionally shrinkable thermoplastic resin foam sheet.

5. The method of claim 1, wherein the shrinkage of said uni-directionally shrinkable thermoplastic resin foam sheet is such that when said sheet is heated at 135°C for about 5 seconds, said shrinkage in said first direction is at least 1.5 times the shrinkage in said other directions perpendicular to said first direction and said shrinkage factor in said first direction is at least about 15%.

6. The method of claim 1, wherein said bottom plate is inserted into said second mold member prior to the insertion of said resulting cylindrical article into said second mold member.

7. The method of claim 1, wherein said bottom plate is placed inside the peripheral bottom edge of said resulting cylindrical article.

8. A method of producing receptacles of a thermoplastic resin foam sheet, which comprises the steps of:
forming a cylinder of a rectangular-shaped unidirectionally shrinkable thermoplastic resin foam sheet which, when heated, shrinks in a first direction to a greater extent than other directions perpendicular to said first direction, so that when heated, said thermoplastic resin foam sheet will shrink toward the central axis of said cylinder;
bonding the side edges of said sheet forming said cylinder;
heating said foam sheet on a molding form to a termperature above the softening point of said resin, whereby said cylindrical foam sheet shrinks toward the central axis of said cylinder formed by said sheet and intimately contacts the circumferential side wall of said molding form to form a bottomless cylindrical article, said molding form being of a size such that a portion of said form sheet extends beyond one end surface of said molding form;
further bending the circumferential edge of said cylinder formed by said sheet which extends beyond said end surface of said molding form to circumferentially cover the circumferential edge of said molding form;
removing the resulting cylindrical article from said molding form;
inserting the resulting cylindrical article on a male mold member of a mold, comprising a male mold member and a female mold member, having a hollow part provided at the upper part of a mold cavity formed by said male mold member and said female mold member, which can be heated and cooled;
inserting said male mold member having said cylindrical article together with a bottom plate for said cylindrical article so that the bottom portion of said cylindrical article is adjacent said bottom plate into the female mold member of said mold;
compression-molding said article under heat thereby bonding said bottom plate to the bottom of said cylindrical article; and
pressing the upper edge of said cylindrical article which is positioned at said hollow part under heat to form a rib which reduces in volume.

9. The method of claim 8, wherein said uni-directionally shrinkable thermoplastic resin foam sheet has a thickness of about 0.25 to 2 mm and a density of about 0.4 to 0.06 g/cc.

10. The method of claim 8, wherein the resin of said uni-directionally shrinkable thermoplastic resin foam sheet is a polystyrene resin.

11. The method of claim 8, wherein the resin material of said bottom plate is the same as the resin material of said uni-directionally shrinkable thermoplastic resin foam sheet.

12. The method of claim 8, wherein the shrinkage of said uni-directionally shrinkable thermoplastic resin foam sheet is such that when said sheet is heated at 135°C for about 5 seconds, said shrinkage in said first direction is at least 1.5 times the shrinkage in said other directions perpendicular to said first direction and said shrinkage factor in said first direction is at least about 15%.

13. The method of claim 8, wherein said bottom plate is inserted into said female mold member prior to the insertion of said male mold member having thereon said cylindrical article into said female mold member.

14. The method of claim 8, wherein said bottom plate is placed inside the peripheral bottom edge of said resulting cylindrical article prior to insertion in said male mold member.

* * * * *